United States Patent [19]

Thiemann et al.

[11] Patent Number: 4,656,743

[45] Date of Patent: *Apr. 14, 1987

[54] ARRANGEMENT FOR DETERMINING THE POSITION OF A HOLLOW SECTION SYSTEM WHICH IS PRESSED FORWARD

[75] Inventors: Heinz Thiemann, Bardowick; Bernd Schwarz, Hamburg; Dieter Langhans, Appen-Unterglinde, all of Fed. Rep. of Germany

[73] Assignee: Ed. Zülin Aktiengesellschaft, Stuttgart, Fed. Rep. of Germany

[ * ] Notice: The portion of the term of this patent subsequent to Apr. 30, 2002 has been disclaimed.

[21] Appl. No.: 709,524

[22] Filed: Mar. 8, 1985

[30] Foreign Application Priority Data

Mar. 8, 1984 [DE] Fed. Rep. of Germany ....... 3408437

[51] Int. Cl.⁴ ............................................. G01B 11/27
[52] U.S. Cl. ....................... 33/1 H; 175/45; 299/1; 356/153
[58] Field of Search ................. 33/1 H, 300, 301, 304, 33/313, 315; 356/153; 299/1; 175/45

[56] References Cited

U.S. PATENT DOCUMENTS

| | | | |
|---|---|---|---|
| 3,321,248 | 5/1967 | Williamson et al. | 299/1 |
| 3,484,136 | 12/1969 | Colson | 299/1 |
| 3,498,673 | 3/1970 | Ledray et al. | 299/1 |
| 4,392,744 | 7/1983 | Tatsuhama et al. | 299/1 |
| 4,513,504 | 4/1985 | Nussbaumer et al. | 33/1 H |

*Primary Examiner*—William D. Martin, Jr.
*Attorney, Agent, or Firm*—Becker & Becker, Inc.

[57] ABSTRACT

An apparatus for determining the position of a hollow section system which is pressed forward. Measuring apparatus are arranged one behind the other in the hollow section system. Measuring points are also provided. Each measuring apparatus has a light source for marking the position, a position detector, and an optical system. The measuring apparatus are arranged in such a way that the projection of the light source of each measuring apparatus takes place to the position detector of the respective adjacent measuring apparatus. The measuring apparatus are connected to each other for the transmission, and receiving, of signals present at the position detectors. The coordinates of the measuring apparatus can be determined from the signals, and from this the spatial position of the hollow section system can be determined.

19 Claims, 6 Drawing Figures

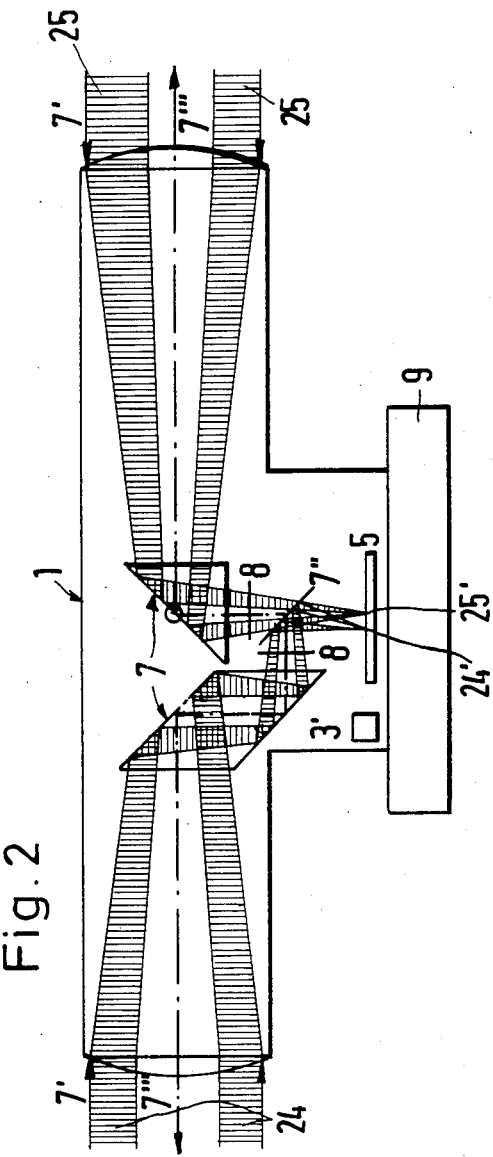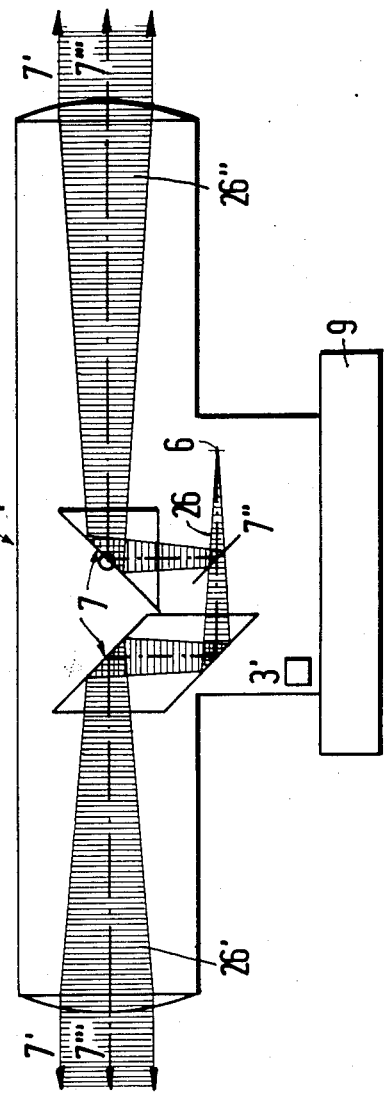

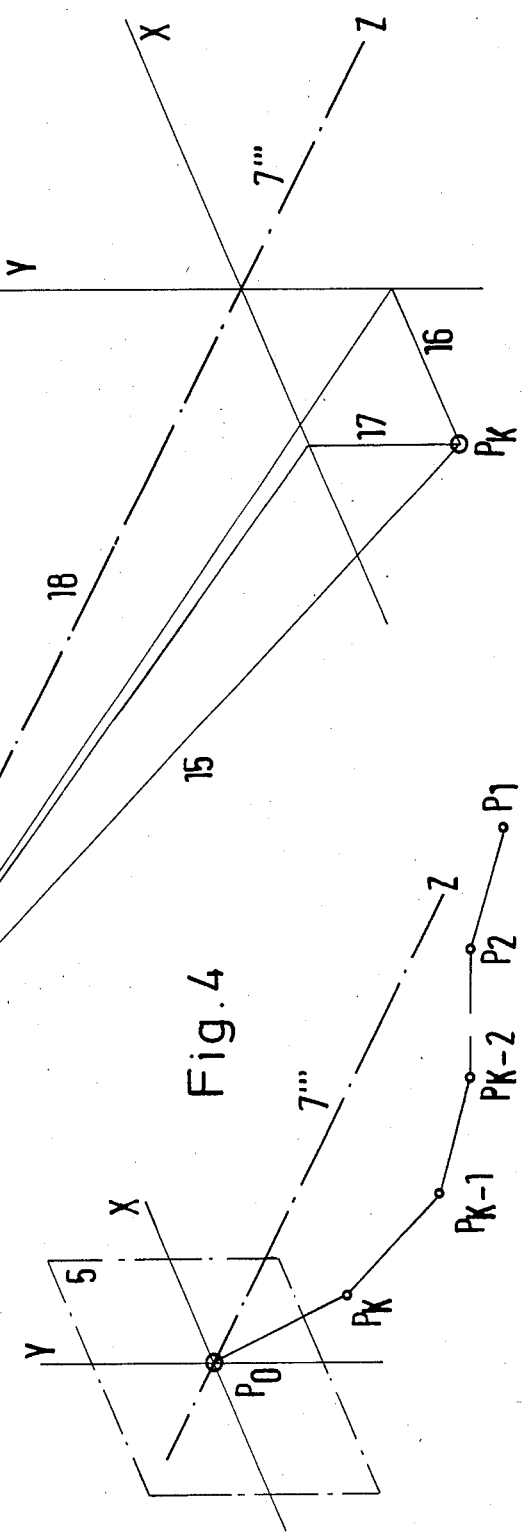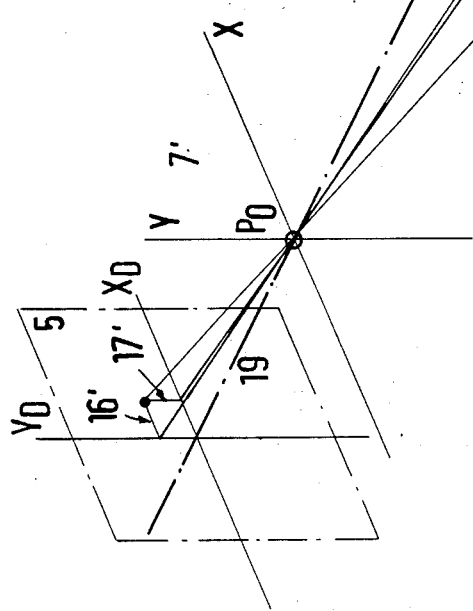

ARRANGEMENT FOR DETERMINING THE POSITION OF A HOLLOW SECTION SYSTEM WHICH IS PRESSED FORWARD

BACKGROUND OF THE INVENTION

1. Field of the Invention

The present invention relates to an arrangement for determining the position of a hollow section system which is pressed forward, in particular one having a curvature, utilizing measuring apparatus arranged one behind the other in the hollow section system, and at least one measuring point.

2. Description of the Prior Art

In conventional and mechanical underground working or mining, the pressing forward of assembled hollow profile systems, such as pipes or tunnels, is gaining increasing significance. Pressing forward refers to a method in which a hollow section system, of any cross section, composed of several similar structural components is pressed into the earth, generally from a shaft; at the same time, the earth entering the hollow section is loosened and discharged through the hollow section system. A controllable member, for example a cutting edge, is located at the front end of the hollow section system; this member facilitates penetration into the earth, and in its protection the excavation takes place. In this case, the earth present at the face is loosened either by hand or mechanically, and is removed.

The entire system is pressed forward, by the length of one structural component, by the main presses installed in the press shaft. The elongation of the hollow section system takes place cyclically in the press shaft by attaching a new structural component to the end of the existing hollow section system after the retraction of the presses. The installation and pressing forward of the entire hollow section system thus takes place from one point.

For controlling the direction, the putting edge supports at least three control presses. According to the soil conditions, the hollow section system reacts more or less quickly to control measures which are undertaken. For accurate control of the hollow section system which is to be pressed forward, it is necessary to check continuously that the route and gradient are being maintained. In conventional measuring methods, the height and position of the hollow section system must be measured each time from the shaft. The measuring distance in this case becomes constantly longer, so that these methods are very complicated and expensive. Moreover, it is necessary to stop the driving operation during the time when measurements are being carried out. In the case of control corrections after a measurement, there is a danger that control pressures which are introduced bring about an overtravel to the other side of the reference curve, which again makes corrections necessary and possibly leads to an increasing overtravel in both directions. An accurate control therefore consists of prompt recognition of deviations, which must then be compensated for depending on the skill and experience of the operator.

Guide beam systems have become known for the exact guidance of the cutting edge; generally focused light beams are made visible on an indicator panel provided with cross wires at the cutting edge. The operator is then able to control the cutting edge as a function of the deviations on the indicator panel. Since the light beam emitter is arranged to be stationary, but the hollow section system and the cutting edge are pressed forward, in this system the driving operation must continuously be interrupted in order to bring the light beam emitter forward again to the cutting edge, and to calibrate it. This interruption occurs particularly frequently if the section being driven has a curve, since the light beam emitter operates solely on a straight line. Its use is therefore possible with acceptable expense solely in the case of gradients having only a slight curve. The frequent adjustment and new calibration necessary in this case also is very time-consuming, so that, since the driving operation must cease during measuring, the driving speed is low.

In another known method for determining the position of the cutting edge, a transmitter installed in the cutting edge emits pulses, which are detected aboveground. According to classical geodetic methods, the position of the cutting edge is then determined. However, this method can only be used in a restricted manner with sufficient accuracy under built-up areas or under water surfaces. Moreover, it gives information only about the position of the cutting edge, and does not take into consideration a lateral shifting of the hollow section system, which substantially influences the direction of the cutting edge.

The use of a gyrocompass is also known, which is connected to a course recorder, and which is already used for bridging the times between the necessary geodetic point and direction determinations in the hollow section system. However, drifting of the compass falsifies the measurement results, so that a conventional geodetic point and direction determination remains absolutely necessary. Since a gyrocompass detects only the azimuthal alignment of the cutting edge, due to its system, no information about the height of the cutting edge is available.

An object of the present invention is to provide an arrangement of the aforementioned general type which is designed in such a way that it is possible to carry out determinations of the spatial position of a hollow section system, during the pressing forward of the latter, as frequently as desired and in short succession, without the pressing operation being hindered or interrupted.

BRIEF DESCRIPTION OF THE DRAWINGS

This object, and other objects and advantages of the present invention, will appear more clearly from the following specification in connunction with the accompanying drawings, in which:

FIG. 2 shows the receiving path of rays of an automatic measuring apparatus of the arrangement according to the invention;

FIG. 3 shows the transmitting path of rays of the automatic measuring apparatus of the arrangement according to the invention;

FIG. 4 shows the coordinate system of a traverse;

FIG. 5 is a sketch for calculating the position of the measuring apparatus in the hollow section system.

SUMMARY OF THE INVENTION

Figure 1:
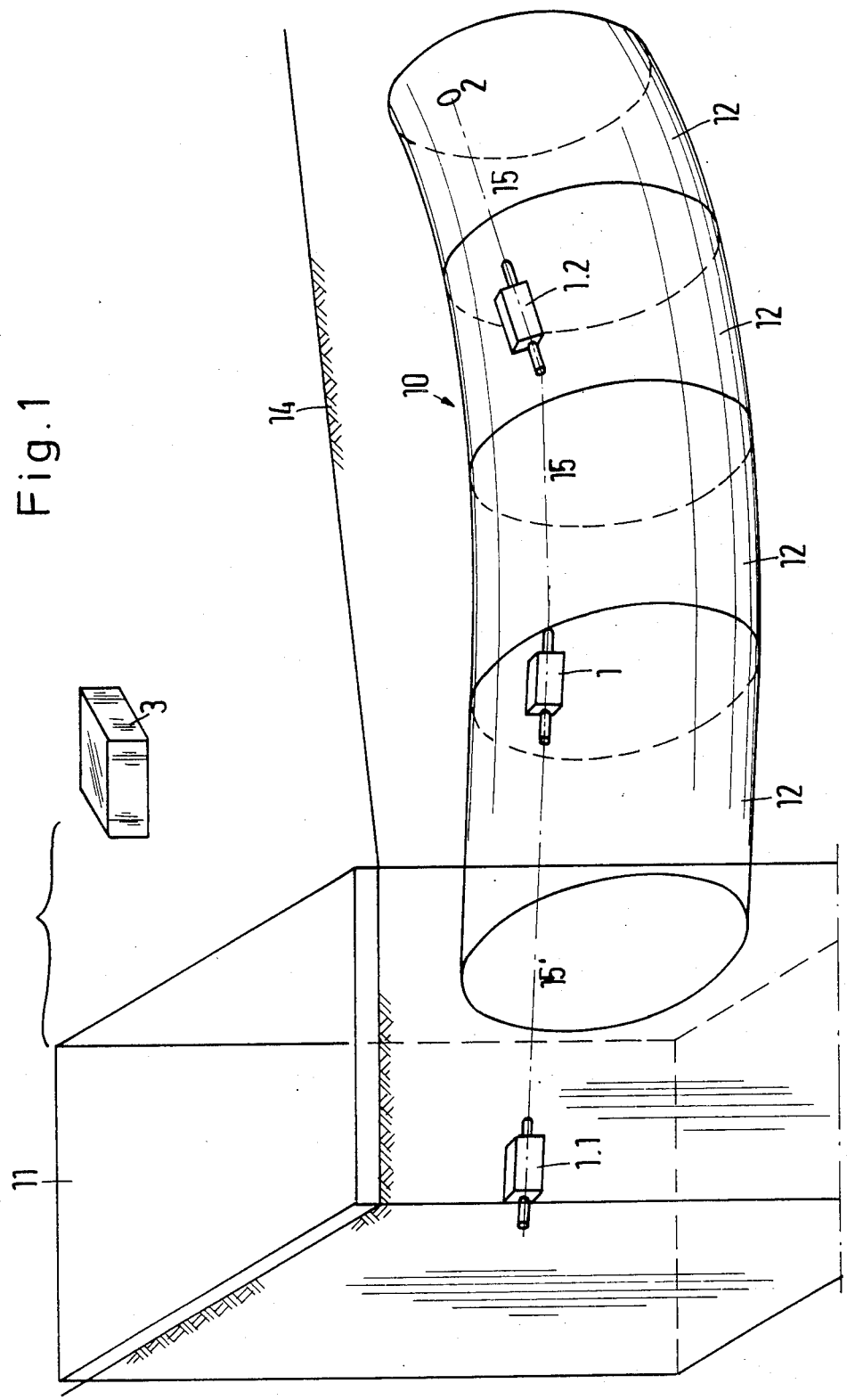
FIG. 1 is a diagrammatic view of a building site for pressing forward a hollow section system in which are disposed several measuring apparatus of one inventive embodiment of an arrangement according to the present invention.

The arrangement of the present invention is characterized primarily in that each measuring apparatus comprises at least one light source for position marking, at least one position detector, and an optical system; in that the measuring apparatus are arranged in such a way that a projection of the light source of each measuring apparatus to the position detector of the respectively adjacent measuring apparatus takes place; and in that the measuring apparatus are connected to each other for the transmission of, and for receiving, signals present at the position detectors.

With the arrangement according to the invention, it is possible to ascertain at any instant, without interrupting the pressing operation, the measuring data necessary for calculating the position determination, so that the position of the hollow section system can be checked at any time. The light source of each measuring apparatus emits rays, which are directed by the optical system to the respective adjacent measuring apparatus. The optical system of this adjacent measuring apparatus directs the rays to the position detector. Conversely, the rays of the adjacent measuring apparatus are directed by the optical system of the other measuring apparatus to its position detector. The incident rays produce signals in the position detectors, which are transmitted to the respective adjacent measuring apparatus, where they are received. The coordinates of the measuring apparatus can be determined from these signals according to simple optical and trigonometric equations. The spatial position of the hollow section system can then be ascertained from these coordinates. It is thus possible to monitor tendencies toward possible direction changes, so that a correction of the direction can be carried out early. With higher directional accuracy, the driving speed can be increased substantially, since there are no longer any pauses for the measuring operations. Due to the arrangement according to the invention, the contradictory requirements, namely increased driving speed with increased directional accuracy, can be fulfilled.

A chain-like arrangement of measuring apparatus allows automatic spatial traverse measurements of high precision during the driving operation. Since each measuring apparatus is simultaneously a transmitter and receiver station, the position of a traverse station (of the measuring apparatus) is marked by the integrated light source, and is received and recorded by the position detectors which are likewise installed in a fixed manner. The signals present at the outputs of the position detectors, which signals describe the coordinate values of the light sources focused by the receiving optics, can then be used to calculate the spatial position of the hollow section system. Advantageously, the signals are transferred, by modulation of the integrated light source, from measuring apparatus to measuring apparatus as far as an evaluation unit, which ascertains the deviation of the hollow section system from the reference position by appropriate algorithms. While the hollow section system is being pressed forward, measurements can be carried out as frequently as required at any time, so that it is possible to check the spatial position of the hollow section system nearly continuously, and thus to have a continuous direction correction of the cutting edge. The positional and directional accuracy of the driving operation can thus be substantially increased.

DESCRIPTION OF PREFERRED EMBODIMENTS

Referring now to the drawings in detail, in the illustration according to FIG. 1, a hollow section system 10, which is composed of several sections 12, is driven forward into the earth 14 from a pit or shaft 11 in a known manner by a pressing device (not shown) located in the shaft. In the hollow section system 10, automatic measuring apparatus 1 are successively attached at a distance from one another in the longitudinal direction of the system 10. They are arranged in such a way that each measuring apparatus has visual contact with the preceding and the following measuring apparatus 1.1 and 1.2. In this way, a traverse or polygonal course is formed (FIG. 4), by means of which the position of the hollow section system 10 can be determined. The measuring apparatus 1 operate with beams or rays. Therefore, the measuring apparatus 1 must be at an adequate safety distance from the inner wall of the hollow section system 10 in order to prevent diffraction of the rays. At the end point of the traverse formed by the measuring apparatus 1, one or more measuring points 2 are installed in a suitable arrangement at a distance from the last measuring apparatus. The measuring points 2 are preferably signal transmitters, and are formed in particular by luminescent or laser diodes.

In order that the cross-section of the hollow section system 10 is impaired only slightly by the measuring apparatus 1, the latter are advantageously attached in the upper region or in the roof region of the hollow section system. There is consequently sufficient space in the hollow section system 10 for conveying apparatus and supply and discharge lines, which are guided from the front end rearwards towards the press shaft 11. Since the measuring apparatus 1 and the measuring points 2 are rigidly connected to the hollow section system 10, they are moved with the latter in the driving or pressing direction. The distances 15 between the measuring apparatus 1, and between the last measuring apparatus and the measuring points 2, are ascertained once at the beginning of the pressing operation with a tape measure or other means for measuring distances, and are fed to an evaluation unit 3 as fixed values, which are stored during the entire pressing operation.

The initial distance 15' of the traverse formed by the measuring apparatus 1 and the measuring points 2, between the measuring apparatus 1.1 in the shaft 11 and the first measuring apparatus 1 in the hollow section system 10, is advantageously detected by an electronic scanning device, and is supplied to the evaluation unit 3 by way of a teletransmission or remote control.

In a more advantageous development, it is also possible to carry out the measurement of these distances 15, 15' with a distance meter integrated in the measuring apparatus, and to measure the distances again before each spatial position determination of the hollow section system 10. The accuracy of the position determination can thus be increased further.

FIGS. 2 and 3 diagrammatically show the construction of an automatic measuring apparatus 1. As basic components, it advantageously comprises a position detector 5, an optical system 7, 7', 7", a light source 6, and a automatic leveling unit 9.

The position detector 5 is advantageously a planar photoelectronic detector, which supplies electrical signals to its detector surface as a function of the position of a spot of light. The optical system advantageously comprises two centered transmitting and receiving optical systems 7' having the safe optical axes 7''', a deviating or deflecting system 7, and a semi-transparent mirror 7''. The optical axis 7''' points in the direction of one axis of the local coordinate system of the measuring apparatus 1. The focal plane of the optical system 7, 7', 7'' falls in the detector surface of the position detector 5, so that a sharp image is obtained on the position detector. This plane, and the optical axis 7''', describe the local coordinate system of the measuring apparatus 1. The two transmitting and receiving optical systems 7' of the measuring apparatus 1 face each other in opposite directions. As a result, the measuring apparatus 1 can receive the rays emitted by the light sources 6 of the measuring apparatus located respectively in front of and behind it, and can even emit rays to these measuring apparatus.

The light source 6 marks a measuring point of the traverse (FIG. 4), and is focused on the position detector 5 of the respective adjacent measuring apparatus by the optical system 7, 7', 7''.

Each measuring apparatus 1 operates as a receiver and a transmitter. FIG. 2 shows the path of rays when the measuring apparatus 1 operates as a receiver. The rays 24 and 25 emitted by the measuring apparatus 1.1 and 1.2 (FIG. 1) located behind and in front of this measuring apparatus 1 are refracted by the optical systems 7' to the deflecting systems 7, which then deflect the rays to the position detector 5. The rays 24, 25 strike the latter as spots of light 24', 25'; preferably, only one spot of light 24' or 25' is focused on the position detector 5. In order to achieve this, diaphragms 8 may be located in the paths of rays, so that only the rays of the front or rear measuring apparatus reach the position detector 5.

FIG. 3 shows the path of rays when the measuring apparatus 1 operates as a transmitter. The rays 26 emitted by the light source 6 strike the semi-transparent mirror 7''. Part of the rays 26 passes through the mirror 7'' and is deflected by the subsequent deflecting system 7 to an optical system 7'. The other part of the rays 26 is reflected on the mirror 7'' and reaches the other deflecting system 7, which in the embodiment is a prism and deflects the rays to the other optical system 7'. The rays 26' and 26'' emerging from the two optical systems 7' are received by the rear and the front measuring apparatus 1.1 and 1.2, as has been described with reference to FIG. 2.

In use, the measuring apparatus operate simultaneously as transmitter and receiver. The rays 24, 25 and 26', 26'' entering the measuring apparatus and leaving it are directed parallel to each other. The incident rays 25, 25' arrive, for example, in the boundary region of the optical systems 7', whereas the rays 26', 26'' enter the measuring apparatus or leave the latter in the central region of the optical systems. The incident and emerging rays 24, 25 and 26', 26'' are isolated optically from one another in order to preclude interaction between these rays.

In one advantageous development, when focusing several light sources 6 on the position detector 5, it is possible to distinguish between them by modulation of the light sources. In order to be able to distinguish these various light sources 6 from each other, the light sources can be modulated. This can be achieved, for example, due to the fact that they are focused in a certain sequence on the position detector 5, or that the light sources have different wave lengths.

The deflecting systems 7 are not absolutely necessary. For this case, the measuring apparatus 1 has two position detectors 5, which lie in the paths of rays 24 and 25 and have a fixed relationship with respect to each other. Moreover, two light sources 6 are necessary, in order that light rays 26' and 26'' can be emitted through both optical systems 7'.

With the automatic leveling unit 9, which is known per se, the automatic measuring apparatus 1 is brought into a horizontal position using gravitation. In one advantageous embodiment, an electronic system can be used for this. Another advantageous construction of the automatic leveling unit 9 consists in the use of a mechanical automatic unit, which may be a cardanic suspension with a plumb rod. These embodiments are known.

Figure 6:
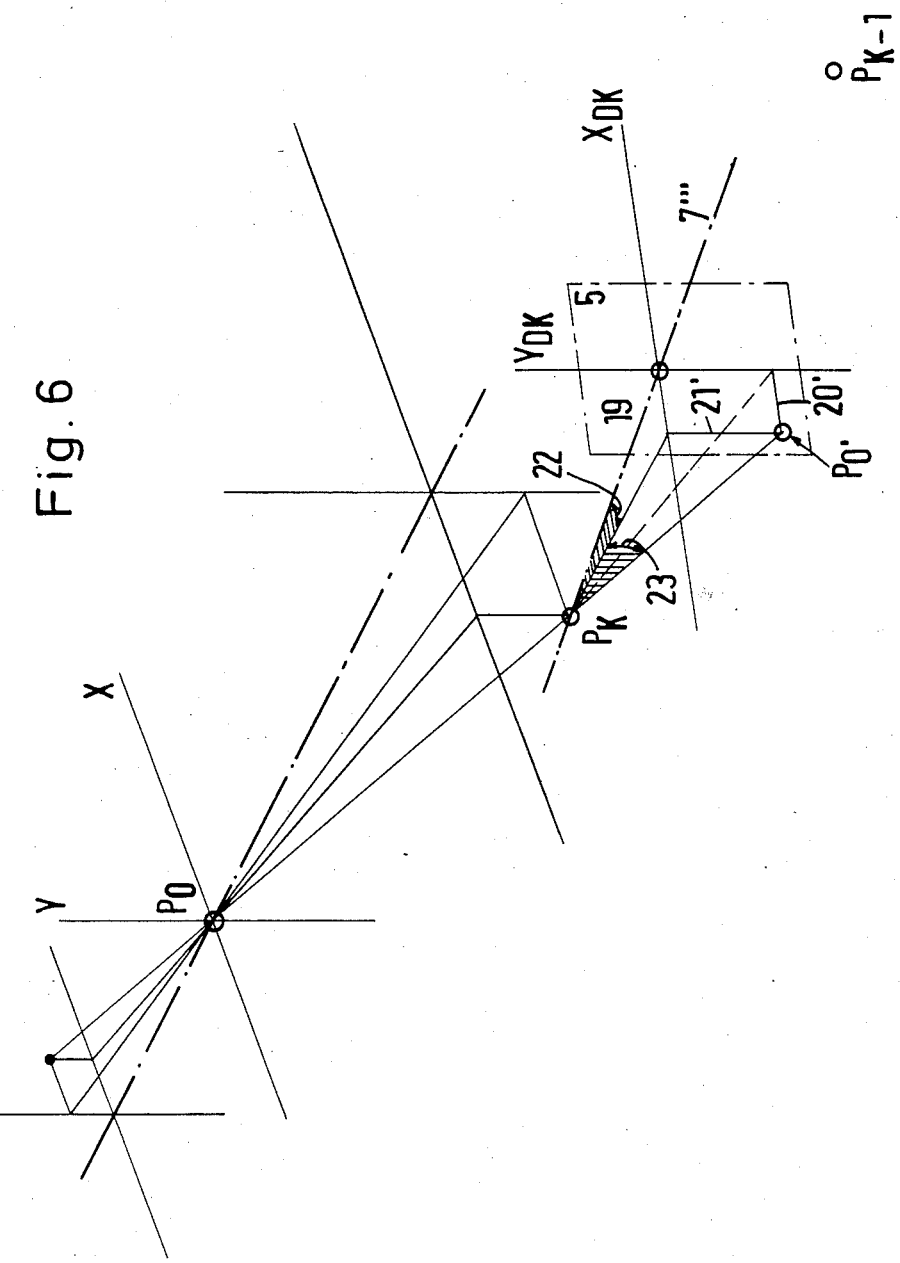
FIG. 6 is a sketch for calculating the spatial direction of the optical axis of the measuring apparatus in the hollow section system.

The measuring principle of the measuring apparatus 1 will be explained with reference to FIGS. 4 to 6.

First of all, the measuring apparatus 1.1 in the press shaft 11 is adjusted in a horizontal position by the automatic leveling unit 9. The optical axis 7''' of this measuring apparatus 1.1 forms the Z-direction and points in an arbitrary, but known spatial direction (FIG. 4). The detector surface of the position detector 5 lies parallel to the X-Y plane, and is adjusted by means of the automatic leveling unit 9 in such a way that the X-axis extends horizontally. The points $P_K$, $P_{K-1}$, $P_{K-2}$, . . . , $P_2$, $P_1$ (FIG. 4) represent the main points of the optical systems 7, 7', 7'' of the measuring apparatus 1, and correspond to the traverse stations of the traverse. The traverse stations are marked by the light sources 6 of the measuring apparatus. In order to determine the unknown coordinates 16, 17, 18 of the main point $P_K$ of the first measuring apparatus 1 in the hollow section system 10 (FIG. 5), the rays of the light source 6 of this measuring apparatus 1 are focused on the position detector 5 of the preceding measuring apparatus 1.1 (main point $P_O$), as has been described with reference to FIGS. 2 and 3. In the X-Y- direction, the focused measuring point has the image coordinates 16' and 17'. From the latter, and from the focal length 19 of the preceding measuring apparatus 1.1, according to the laws of geometric optics, it is possible to determine the coordinates 16, 17, 18 of the main poin $P_K$, and thus of the first measuring apparatus 1 in the hollow section system 10 in the main point $P_K$.

The distance 18 which is to be measured along the Z-axis, and which forms the Z-coordinate of the main point $P_K$, can be measured mechanically or with range finders or telemeters, which determine the section 15, i.e. the distance between the measuring apparatus 1 and 1.1, and from this distance ascertain the section 18 according to geometric calculations. Telemeters of this type are preferably located in the measuring apparatus.

After determining the coordinates 16, 17, 18 of the main point $P_K$, traversing can be continued. The measuring apparatus 1 is located at the main point $P_K$. The direction of its optical axis 7''' is arbitrary (FIG. 6). However, the light sources 6 of the preceding and following measuring apparatus at the main points $P_O$ and $P_{K-1}$ (FIG. 4) must be focused on the position detector 5 of the measuring apparatus at $P_K$. In order to determine the coordinates of the main point $P_{K-1}$, the spatial direction of the optical axis 7''' of the measuring apparatus at the main point $P_K$ must be determined by the horizontal angle 22 between the optical axis 7''' and the X-coordinate 20' of the image point $P_O$, on the position detector 5 of the measuring apparatus at $P_K$, and by the vertical angle 23 between the horizontal plane and Y-coordinate 21' of the image point $P_O$, on the position detector of the measuring apparatus at $P_K$. According to the laws of geometric optics, the position detector 5 of the measuring apparatus 1 at the main point $P_K$ supplies the image coordinates 10', 21' of the light sources 6 at the main point $P_O$ in the coordinate system $X_{D,K} - Y_{D,K}$, so that with simple trigonometric equations, the spatial direction of the optical axis 7''' of the measuring apparatus at the main point $P_K$ can be determined.

With the previously determined coordinates 16, 17, 18 of the main point $P_K$ and of the spatial direction of the optical axis 7''' of the measuring apparatus 1 at the main point $P_K$, the prerequisites for determining the coordinates of the following main point $P_{K-1}$ are fulfilled. Determining the coordinates of this main point $P_{K-1}$ takes place in a manner similar to the preceding coordinate determination of the main point $P_K$. In the manner described, the coordinates of all the main points of the traverse (FIG. 4) are determined. The spatial position of the horizontal section system 10 can then be determined from these coordinates.

The signals present at the outputs of the position detectors 5, which signals describe image coordinate values of the light sources 6 focused by the optical system 7, 7', 7'', are preferably already processed in the measuring apparatus 1 by a suitable electrical circuit and a microprocessor, so that average values of the image coordinates for any time period are already available. The coordinates of the main points $P_K$ (traverse stations) are calculated in the evaluation unit 3 with these image coordinates. The data of the $i^{th}$ measuring apparatus 1 are thus transmitted with remote transmission to the i+1 measuring apparatus 1, and from there are sent to the i+2 measuring apparatus. This process is repeated until all the data have been transmitted to the evaluation unit 3. For this purpose, a data bus to the evaluation unit 3 is advantageously installed, in which the data of the individual measuring apparatus 1 are arranged in sequential order. In an advantageous further development, the data bus sends the results of the evaluation in the opposite direction to the operator in the hollow section system 10. The light sources 6 of the measuring apparatus 1 are preferably used as transmitters for the transmission of data. The data stream is then received by the position detector 5. In an advantageous construction, receipt of the data stream is effected with a broad-band detector integrated in the receiving optical system 7'. Data transmission of this type, and data receipt of this type, are known per se. In this preferred construction, the light sources 6 serve not solely for determining the position of the hollow section system 10, but also for the transmission of data.

In a simplified embodiment, the transmission of data and results takes place independently of the measuring apparatus 1. For this purpose, an optical data transmission system, for example, can be installed, with which the data transmission is carried, for example, by light modulation, preferably by modulation of the light source 6. The measuring apparatus can be controlled separately by remote control in order to set them to transmit or to receive, for example, or to actuate the diaphragms 8.

In an advantageous further development, the measuring apparatus 1 are controlled by integrated process computers 3' (FIGS. 2 and 3).

In the evaluation unit 3, the coordinates of the main point $P_K$ (traverse stations) and of the measuring points 2 are calculated with these data. At the same time, the deviation of the hollow section system 10 from the correct or reference position is calculated.

With the inventive apparatus, it is possible at any time to inform the operator at the control desk of the cutting edge at the front end of the hollow section system 10, of the spatial position of the hollow section system. Deviation tendencies of the hollow section system 10 which is pressed forward can be ascertained early on the basis of the plurality of possible measurements during the pressing operation, so that it is possible to initiate measures to counter this. In one advantageous embodiment, after developing suitable control algorithms, a connection of the control members of the cutting edge to the evaluation unit 3 is undertaken, so that automatic navigation along a predetermined curve can take place.

The present invention is, of course, in no way restricted to the specific disclosure of the specification and drawings, but also encompasses any modifications within the scope of the appended claims.

What we claim is:

1. An arrangement for determining the position of a hollow section system which is pressed forward as a hollow profile strand in which sequentially in definite space intervals there are provided fixedly arranged measuring points of which positions respectively are ascertainable and detectible; said arrangement utilizes measuring apparatus disposed one after the other as spaced along a polygon course with known separations along the hollow profile strand as an instrumentally technical unit in said hollow section system whereby a first measuring apparatus in the polygon course is arranged with a definite orientation of a coordinate system thereof, and including at least one self-illuminating measuring point; the improvement in combination therewith wherein:

each of said measuring apparatus comprises at least one light source operable to send out parallel light bundles in opposite directions with a common optical axis for marking a position, at least one position detector that measures spatial angle of incidence of the parallel light bundles as to adjoining measuring apparatus, each position detector being arranged sequentially in series with the hollow profile strand and including evaluation means connected therewith and an optical system to detect light emitted from the respectively adjoining measuring apparatus; said measuring apparatus being disposed in such a way that there takes place a projection of said light source of each of said measuring apparatus onto said position detector of the respectively adjacent measuring apparatus and deflecting rays upon the respective position detector; said measuring apparatus one after another being coupled with one another both to transmit as well as to receive measuring data signals present at said position detectors with respect to the evaluation means.

2. An arrangement in combination according to claim 1, in which said measuring point is in the form of a signal transmitter.

3. An arrangement in combination according to claim 2, in which said signal transmitter includes luminescent or laser diodes.

4. An arrangement in combination according to claim 2, in which said measuring point is detected by a detector included with said optical system.

5. An arrangement in combination according to claim 1, in which said light sources of adjacent measuring apparatus are modulated. which said light sources of adjacent measuring apparatus are modulated.

6. An arrangement in combination according to claim 1, in which said light sources of adjacent measuring apparatus have different band-widths.

7. An arrangement in combination according to claim 1, which includes a diaphragm adjustably disposed within a given measuring apparatus in the path of the rays emitted by said light sources of adjacent measuring apparatus.

8. An arrangement in combination according to claim 1, in which at least one optical deflecting system is provided in the region between said optical system and said position detector.

9. An arrangement in combination according to claim 8, in which said deflecting system comprises at least one semi-transparent mirror.

10. An arrangement in combination according to claim 9, in which said semi-transparent mirror is disposed in the path of rays of said light source.

11. An arrangement in combination according to claim 7, in which said diaphragm is adjustably disposed in the path of rays between said optical system and said position detector.

12. An arrangement in combination according to claim 1, which includes an automatic leveling device for leveling said measuring apparatus.

13. An arrangement in combination according to claim 1, in which a range finder is integrated in each of said measuring apparatus for determining the distance between adjacent measuring apparatus.

14. An arrangement in combination according to claim 1, which, for transmitting measuring data, includes means for modulating the light waves.

15. An arrangement in combination according to claim 14, in which said light sources include means for modulating the light waves.

16. An arrangement in combination according to claim 14, in which each of said measuring apparatus is constructed as a receiver and as a transmitter for measuring data.

17. An arrangement in combination according to claim 1, in which a remote control means can actuate each of said measuring apparatus separately.

18. An arrangement in combination according to claim 1, in which a process computer is integrated in each of said measuring apparatus for control thereof.

19. An arrangement in combination according to claim 1, in which each of said measuring apparatus is connected to an evaluation unit.

* * * * *